US006643358B2

(12) United States Patent
Brablec

(10) Patent No.: US 6,643,358 B2
(45) Date of Patent: *Nov. 4, 2003

(54) TELEPHONE ANSWERING APPARATUS AND METHOD FOR CONFIRMING AN ACOUSTIC COMMAND SIGNAL

(75) Inventor: Milos Brablec, Skokie, IL (US)

(73) Assignee: 3Com Corporation, Rolling Meadow, IL (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/085,278

(22) Filed: May 27, 1998

(65) Prior Publication Data

US 2002/0057766 A1 May 16, 2002

(51) Int. Cl.[7] .................................................. H04M 1/64
(52) U.S. Cl. .................................. 379/88.24; 379/93.26
(58) Field of Search .............................. 379/74, 68, 70, 379/88.22, 88.23, 88.24, 88.27, 88.28, 93.01, 93.26

(56) References Cited

U.S. PATENT DOCUMENTS

| 4,700,376 A | * 10/1987 | Ohya et al. ................... 379/77 |
| 4,885,766 A | * 12/1989 | Yasuoka et al. ........ 340/825.22 |
| 5,327,489 A | 7/1994 | Anderson et al. |
| 5,363,431 A | 11/1994 | Schull et al. |
| 5,483,577 A | * 1/1996 | Gulick ..................... 379/88.97 |
| 5,555,289 A | * 9/1996 | Hashimoto ................. 379/67.1 |
| 5,579,377 A | * 11/1996 | Rogers ......................... 379/74 |
| 5,657,376 A | 8/1997 | Espeut et al. |
| 6,026,152 A | * 2/2000 | Cannon et al. ............. 379/142 |

OTHER PUBLICATIONS

Tandy Corporation, Owner's Manual TAD–252 Telephone Answering System, Tandy Corporation, 1987, p. 26.*

* cited by examiner

Primary Examiner—Fan Tsang
Assistant Examiner—Roland G. Foster
(74) Attorney, Agent, or Firm—Baniak Pine & Gannon

(57) ABSTRACT

A telephone answering apparatus for confirming an acoustic command signal includes a controller operatively connected to an acoustic signal detector and to an acoustic signal generator. The controller initiates the transmission of an acoustic response signal to a remote user in response to the detection of an acoustic command signal.

9 Claims, 2 Drawing Sheets

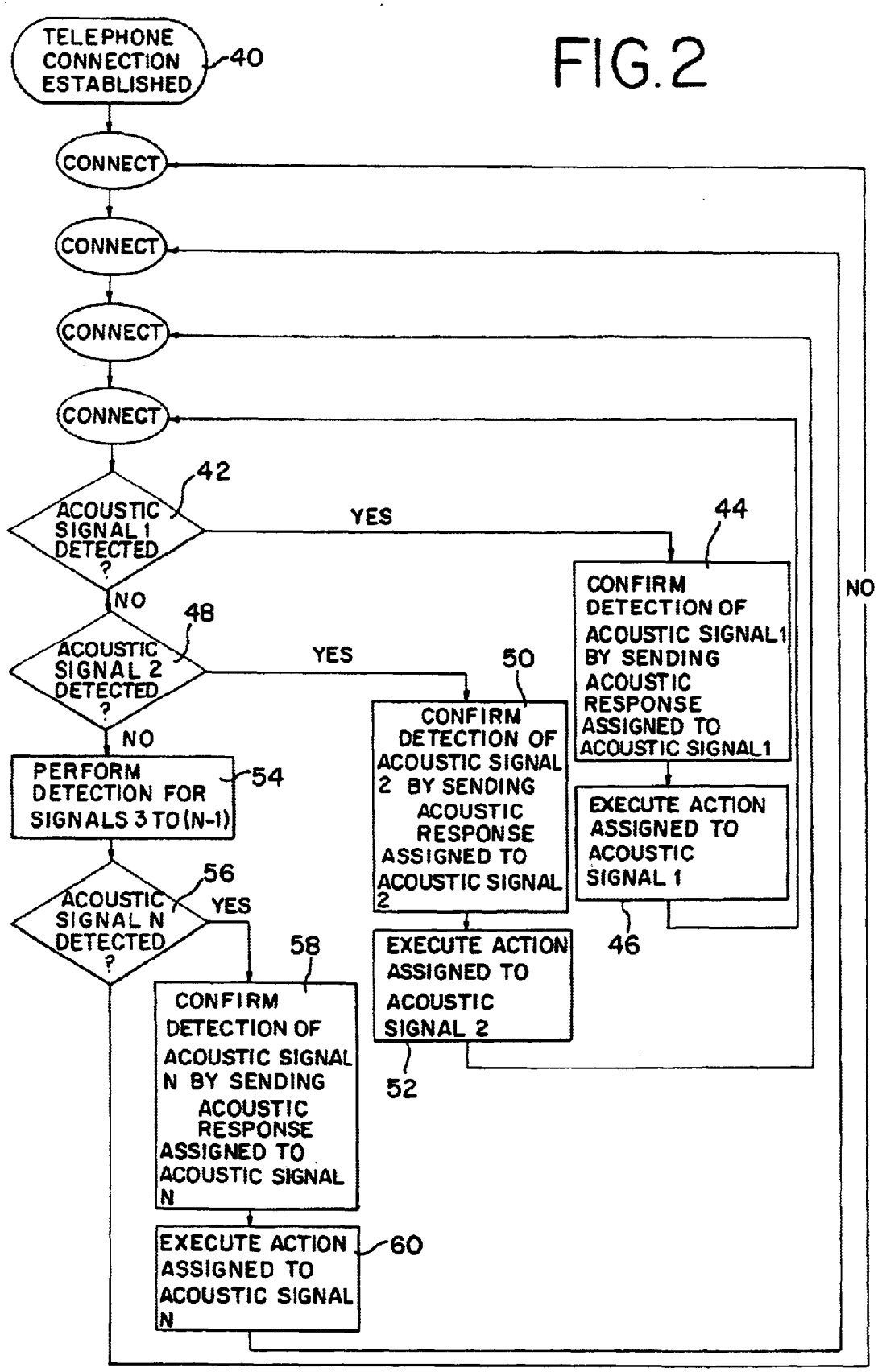

TELEPHONE ANSWERING APPARATUS AND METHOD FOR CONFIRMING AN ACOUSTIC COMMAND SIGNAL

FIELD OF THE INVENTION

This invention relates generally to the field of automatic telephone answering systems and, in particular, to an apparatus for confirming an acoustic command signal from a remote user.

BACKGROUND OF THE INVENTION

There are various types of systems which automatically answer an incoming call and maintain a telephone line connection which are broadly defined as automatic telephone answering systems. These systems include, for example, automatic telephone message recording equipment, message recording systems having remote access message playback, automatic telephone call forwarding equipment, automatic dial-up alarm receiving equipment, automatic answering data entry systems, and other telephone devices used in association with modem equipment.

A remote user may control the various functions of a telephone answering apparatus by sending predetermined acoustic command signals over a telephone line to the telephone answering apparatus. The remote user may accomplish this by pressing designated keys on a keypad which cause Dual Tone Multi Frequency (DTMF) signals to be sent to the telephone answering apparatus. In some situations, however, the DTMF command signals may not be detected by the telephone answering apparatus due to interference or other factors. As a result, the intended command may not be carried out by the telephone answering apparatus. However, the remote user may have no way of knowing whether a command signal has been detected by the telephone answering apparatus and, as a result, may continue to enter additional commands which may result in the telephone answering apparatus performing unintended or erroneous functions.

Accordingly, it would be desirable to have a simple and cost effective apparatus and method for confirming an acoustic command signal sent from a remote user that overcomes the disadvantages described above.

SUMMARY OF THE INVENTION

One aspect of the invention provides a telephone answering apparatus for confirming an acoustic command signal. A controller is operatively connected to an acoustic signal detector and to an acoustic signal generator. The controller initiates the transmission of an acoustic response signal to a remote user in response to the detection of an acoustic command signal. The acoustic command signal may preferably be comprised of a Dual Tone Multi Frequency signal. The acoustic signal detector may preferably detect a Dual Tone Multi Frequency signal. The acoustic signal generator may preferably generate a Dual Tone Multi Frequency signal. A 2-wire to 4-wire network circuit may be operatively connected to the acoustic signal detector and the acoustic signal generator, and a switch may preferably be operatively connected to the 2-wire to 4-wire network circuit.

Another aspect of the invention provides a method for sending an acoustic response signal upon detection of an acoustic command signal. A controller, an acoustic signal detector, and an acoustic signal generator is provided. A telephone connection between a remote user and a telephone answering apparatus is established. An acoustic command signal is sent from the remote user to the telephone answering apparatus. The acoustic command signal is detected, and an acoustic response signal is sent to the remote user in response to the acoustic command signal before an assigned action of the telephone answering apparatus is executed. The execution of the assigned action by the telephone answering apparatus may preferably be initiated. The acoustic signal detector may preferably detect a Dual Tone Multi Frequency signal.

The invention provides the foregoing and other features, and the advantages of the invention will become further apparent from the following detailed description of the presently preferred embodiments, read in conjunction with the accompanying drawings. The detailed description and drawings are merely illustrative of the invention and do not limit the scope of the invention, which is defined by the appended claims and equivalents thereof.

BRIEF DESCRIPTION OF THE DRAWINGS

FIG. 2 is a flow chart which illustrates one example of the operation of a telephone answering apparatus in accordance with the invention.

DETAILED DESCRIPTION OF THE PRESENTLY PREFERRED EMBODIMENTS

Figure 1:
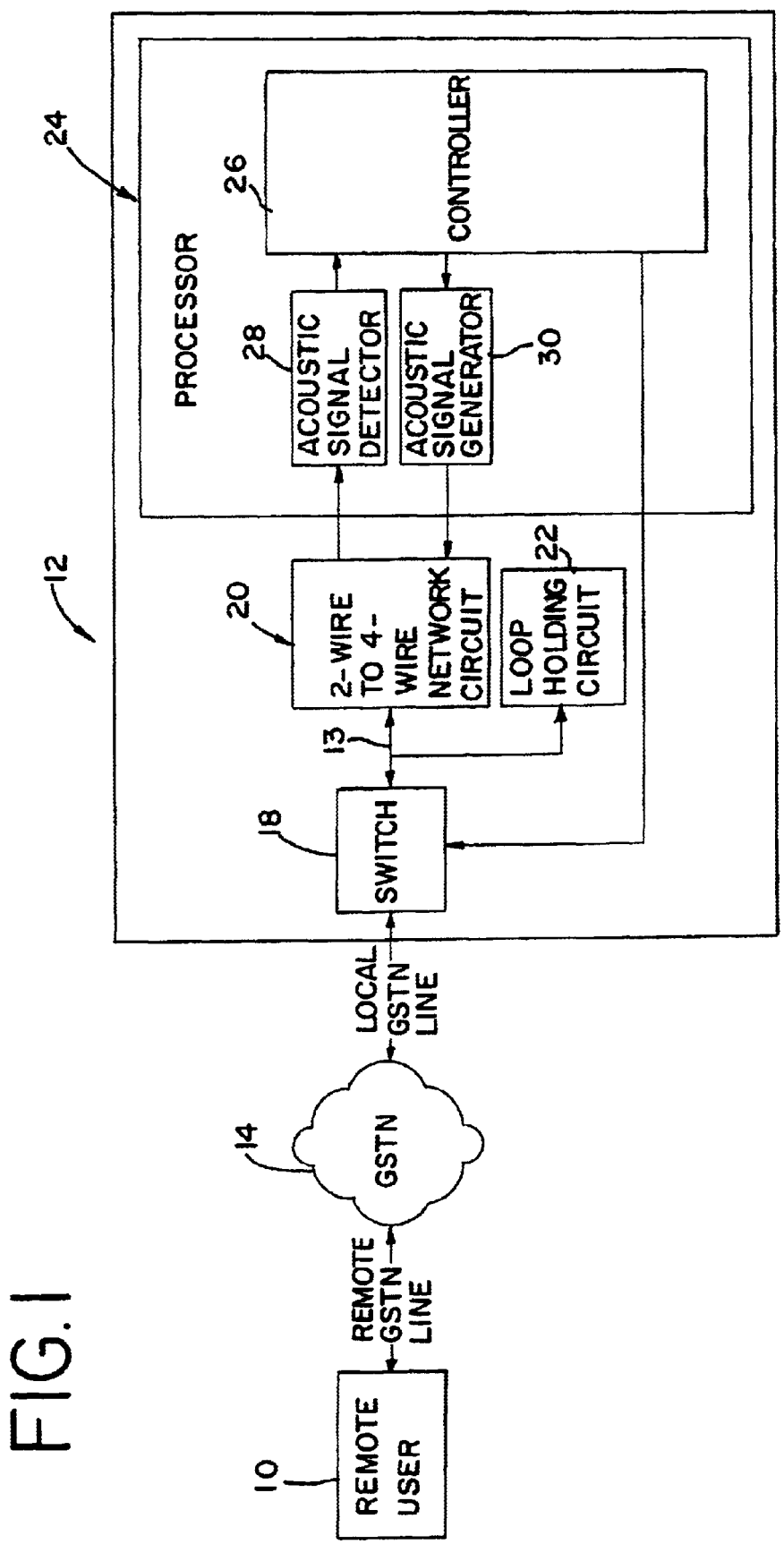
FIG. 1 is a block diagram of a preferred embodiment of a telephone answering apparatus in accordance with the invention.

As shown in FIG. 1, a remote user 10 may establish a telephone connection to a telephone answering apparatus 12 through a General Switched Telephone Network (GSTN) 14. Upon the detection of an acoustic command signal from the remote user 10 by the telephone answering apparatus 12, the telephone answering apparatus 12 sends an acoustic response signal back to the remote user 10 to confirm that the command signal was received by the telephone answering apparatus 12.

The telephone answering apparatus 12 includes a switch 18, a 2-wire to 4-wire network circuit 20, a loop holding circuit 22, and a processor 24. The processor 24 may be any of the commercially available processors. The processor 24 may preferably be a digital signal processor such as, for example, a TMS 320C52 manufactured by Texas Instruments Inc. In the embodiment shown, the processor 24 may preferably execute software or firmware which functionally provides a controller 26, an acoustic signal detector 28 and an acoustic signal generator 30. Alternatively, the controller 26, acoustic signal detector 28, and acoustic signal generator 30 may be comprised of discrete circuits which may be operably connected to the processor 24. One embodiment of the telephone answering apparatus 12 may preferably be the Sportster Message Plus supplied by 3Com Corporation. The controller 26 controls the various functions carried out by the telephone answering apparatus 12. In particular, the controller 26 controls the operation of the acoustic signal generator 30. The acoustic signal detector 28 detects telephone signals such as, for example, Dual Tone Multi Frequency (DTMF) signals which are generated when the user presses one of the various designated keys on a keypad.

The switch 18 may be any of the commercially available switches including, for example, a relay switch or an electronic switch. As shown in FIG. 1, the switch 18 is operatively connected to the 2-wire to 4-wire network circuit 20 and the loop holding circuit 22. Upon activation of the switch 18, the loop holding circuit 22 drains current from the GSTN 14. Upon detection of the current drain by the GSTN 14, the GSTN 14 establishes a telephone connection to the telephone answering apparatus 12 thereby establishing a telephone connection between the remote user 10 and the telephone answering apparatus 12.

The 2-wire to 4-wire network circuit 20 functions to combine signals which are both transmitted and received by the processor 24 along telephone line 13. In the embodiment shown in FIG. 1, the 2-wire to 4-wire network circuit 20 routs telephone signals from the telephone line 13 to the acoustic signal detector 28 and at the same time routs signals from the acoustic signal generator 30 to the telephone line 13.

In operation, the remote user 10 can control the telephone answering apparatus 12 by sending various acoustic command signals through the GSTN 14 to the telephone answering apparatus 12. The command signals may preferably be comprised of Dual Tone Multi Frequency (DTMF) signals such as, for example, those tone signals which are generated when a remote user presses the various keys on a keyboard. Each command signal may preferably correspond to a specific assigned action that the telephone answering apparatus 12 must perform upon detection of that signal. Assigned actions may include, for example, starting a recording, initiating playback of a message, erasing memory, and changing a remote access password. If the acoustic signal detector 28 detects an acoustic command signal sent by the remote user 10, the acoustic signal detector 28 reports the detection of that specific acoustic command signal to the controller 26. The controller 26 immediately initiates transmission of an acoustic response signal to the remote user 10 from the acoustic signal generator 30. The acoustic response signal may preferably be comprised of a specific predetermined acoustic response signal that corresponds to a particular acoustic command signal. The acoustic response signal is transmitted through the 2-wire to 4-wire circuit, through the switch 18, through the GSTN 14 to the remote user 10.

FIG. 2 illustrates one example of the operation of the telephone answering apparatus 12 in accordance with the invention. Reference is made to both FIGS. 1 and 2 in the following discussion. Block 40 represents the establishment of a telephone connection between the remote user 10 and telephone answering apparatus 12 via the GSTN 14. As shown in Blocks 42 and 44, if a first acoustic command signal is detected by the acoustic signal detector 28, the telephone answering apparatus 12 confirms the detection of the first acoustic command signal by sending an acoustic response signal to the remote user 10. As represented in Block 44, the acoustic response signal may be a specific signal assigned to that particular command signal detected i.e., the first acoustic command signal. The telephone answering apparatus 12 sends the acoustic response signal to the remote user 10 before the execution of the assigned action begins to alert the remote user 10 that the command signal has been received and that the assigned action which may not be detectable by the remote user 10 will be executed. As shown in Block 46, the telephone answering apparatus 12 then executes the action assigned to the first acoustic command signal. The acoustic response signal generated by the telephone answering apparatus 12 thus serves as a confirmation to the remote user 10 that the telephone answering apparatus 12 received and detected the remote user's 10 acoustic command signal timely and correctly, and that the assigned action will be executed.

As shown in Blocks 48 and 50, if a second acoustic command signal is detected by the acoustic signal generator 28, the telephone answering apparatus 12 confirms the detection of the second acoustic command signal by sending an acoustic response signal to the remote user 10. As represented in Block 50, the acoustic response signal may be a specific signal assigned to that particular command signal i.e., the second acoustic command signal. As shown in Block 52, the telephone answering apparatus 12 then executes the action assigned to the second acoustic command signal. As shown in Blocks 54–60, the process is repeated for subsequent acoustic command signals.

The telephone answering apparatus 12 may used for in a wide variety of automatic telephone answering systems including, for example, automatic telephone message recording equipment, automatic telephone call forwarding equipment, automatic dial-up alarm receiving equipment, and automatic answering data entry systems. It is contemplated that the telephone answering apparatus 12 may be used in wide variety of other types of telephone answering systems.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

I claim:

1. A telephone answering apparatus for confirming the detection of a plurality of acoustic command signals sent by a remote user, the telephone answering apparatus configured to carry out a plurality of actions, comprising:

a controller operatively connected to an acoustic signal detector for detecting from the remote user the plurality of acoustic command signals for carrying out the plurality of actions, each of the plurality of acoustic command signals being assigned to one of the plurality of actions, the controller also operatively connected to an acoustic signal generator for generating a plurality of acoustic response signals, each of the plurality of acoustic response signals being assigned to one of the plurality of acoustic command signals and each of the plurality of acoustic command signals having only one of the plurality of acoustic response signals assigned thereto, wherein the controller initiates the transmission of one of the plurality of acoustic response signals to the remote user in response to the detection of the acoustic command signal corresponding to the transmitted acoustic response signal before each of the plurality of actions is executed by the telephone answering apparatus thereby confirming to the remote user the detection of the acoustic command signal corresponding to the transmitted acoustic response signal before each of the plurality of actions is executed by the telephone answering apparatus and confirming that each of the plurality of actions will be executed.

2. The apparatus of claim 1 wherein the acoustic command signal comprises a Dual Tone Multi Frequency signal.

3. The apparatus of claim 1 wherein the acoustic signal detector detects a Dual Tone Multi Frequency signal.

4. The apparatus of claim 1 further comprising a 2-wire to 4-wire network circuit operatively connected to the acoustic signal detector and the acoustic signal generator.

5. The apparatus of claim 4 further comprising a switch operatively connected to the 2-wire to 4-wire network circuit.

6. A method for confirming the detection of a plurality of acoustic command signals sent by a remote user comprising:

providing a telephone answering apparatus including a controller, the telephone answering apparatus configured to carry out a plurality of actions, an acoustic signal detector for detecting from the remote user the plurality of acoustic command signals, each of the plurality of acoustic command signals being assigned to one of the plurality of actions, and an acoustic signal generator for generating a plurality of acoustic response signals, each of the plurality of acoustic response signals being assigned to one of the plurality of acoustic command signals and each of the plurality of acoustic command signals having only one of the plurality of acoustic response signals assigned thereto;

establishing a telephone connection between the remote user and the telephone answering apparatus;

sending one of the plurality of acoustic command signals from the remote user to the telephone answering apparatus;

detecting the sent acoustic command signal;

transmitting the acoustic response signal assigned to the sent acoustic command signal to the remote user in response to the detection of the sent acoustic command signal before each of the plurality of actions is executed by the telephone answering apparatus thereby confirming to the remote user the detection of the sent acoustic command signal before each of the plurality of actions is executed by the telephone answering apparatus and confirming that each of the plurality of actions will be executed.

7. The method of claim 6 wherein further comprising:

initiating the execution of the action assigned to the acoustic command signal by the telephone answering apparatus.

8. The apparatus of claim 1 wherein the acoustic signal generator generates a Dual Tone Multi Frequency signal.

9. The method of claim 6 wherein the acoustic signal detector detects a Dual Tone Multi Frequency signal.

* * * * *